United States Patent
Sustic et al.

(10) Patent No.: US 10,738,222 B2
(45) Date of Patent: *Aug. 11, 2020

(54) METHOD FOR MAKING HEXENE-1 CONTAINING AMORPHOUS POLY ALPHA OLEFINS FOR IMPROVED HOT-MELT ADHESIVES

(71) Applicant: REXTAC, LLC, Odessa, TX (US)

(72) Inventors: Andres Sustic, Odessa, TX (US); Nick Fowler, Odessa, TX (US); John Passmore, Odessa, TX (US); John J. Decair, Odessa, TX (US)

(73) Assignee: REXTAC, LLC, Odessa, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/383,914

(22) Filed: Apr. 15, 2019

(65) Prior Publication Data

US 2019/0241774 A1 Aug. 8, 2019

Related U.S. Application Data

(63) Continuation of application No. 15/486,115, filed on Apr. 12, 2017, now abandoned.

(60) Provisional application No. 62/321,663, filed on Apr. 12, 2016.

(51) Int. Cl.
*C09J 123/14* (2006.01)
*C08J 3/00* (2006.01)

(52) U.S. Cl.
CPC .............. *C09J 123/14* (2013.01); *C08J 3/00* (2013.01)

(58) Field of Classification Search
CPC .................................. C09J 123/14; C08J 3/00
See application file for complete search history.

(56) References Cited

U.S. PATENT DOCUMENTS

| | | | |
|---|---|---|---|
| 3,954,697 A | 5/1976 | McConnell et al. | |
| 4,072,812 A | 2/1978 | McConnell et al. | |
| 4,072,813 A | 2/1978 | McConnell et al. | |
| 4,169,116 A | 9/1979 | Trotter et al. | |
| 4,210,570 A | 7/1980 | Trotter et al. | |
| 4,259,470 A | 3/1981 | Trotter et al. | |
| 4,264,756 A | 4/1981 | Trotter et al. | |
| 4,288,358 A | 9/1981 | Trotter et al. | |
| 4,309,522 A | 1/1982 | Dietrich et al. | |
| 4,322,514 A | 5/1982 | Miyoshi et al. | |
| 4,415,718 A | 11/1983 | Miyoshi et al. | |
| 4,826,939 A | 5/1989 | Stuart, Jr. | |
| 4,847,340 A | 7/1989 | Allen et al. | |
| 4,886,853 A | 12/1989 | Foster et al. | |
| 5,262,216 A | 11/1993 | Popat et al. | |
| 5,274,037 A | 12/1993 | Miller | |
| 5,302,675 A | 4/1994 | Sustic et al. | |
| 5,517,046 A | 5/1996 | Hsing et al. | |
| 5,637,665 A | 6/1997 | Sustic et al. | |
| 5,681,913 A | 10/1997 | Sustic et al. | |
| 5,714,554 A | 2/1998 | Sustic et al. | |
| 5,763,547 A | 6/1998 | Kolthammer et al. | |
| 5,852,314 A | 12/1998 | Depetro et al. | |
| 5,940,700 A | 8/1999 | Galbiati et al. | |
| 6,046,473 A | 4/2000 | Blanchard | |
| 6,069,034 A | 5/2000 | Gregory | |
| 6,130,458 A | 10/2000 | Takagi et al. | |
| 6,475,870 B1 | 11/2002 | Huang et al. | |
| 6,586,536 B1* | 7/2003 | Kelley | C08F 210/06 526/124.2 |
| 6,586,543 B1 | 7/2003 | Wey et al. | |
| 6,653,385 B2 | 11/2003 | Wang et al. | |
| 6,770,951 B2 | 8/2004 | Huang et al. | |
| 6,872,279 B1 | 3/2005 | Kolowrot et al. | |
| 7,517,579 B2 | 4/2009 | Campbell et al. | |
| 3,242,198 A1 | 8/2012 | Jiang et al. | |
| 8,551,270 B2 | 10/2013 | Previty et al. | |
| 8,865,824 B2 | 10/2014 | Bunnelle et al. | |
| 8,957,166 B2 | 2/2015 | Kobayashi et al. | |
| 10,160,888 B2 | 12/2018 | Sustic et al. | |
| 10,266,731 B2* | 4/2019 | Sustic | C08J 3/00 |
| 10,421,886 B2 | 9/2019 | Sustic et al. | |
| 2014/0079919 A1* | 3/2014 | Bunnelle | C09J 123/18 428/195.1 |
| 2017/0292047 A1 | 10/2017 | Sustic | |
| 2019/0233685 A1* | 8/2019 | Fowler | C08J 3/00 |

FOREIGN PATENT DOCUMENTS

EP 0211311 A2 2/1987

* cited by examiner

*Primary Examiner* — Patrick D Niland
(74) *Attorney, Agent, or Firm* — Nolte Intellectual Property Law Group

(57) ABSTRACT

A method to make a hot-melt polymer formulation with from 50 wt % to 100 wt % of a propylene-co-butene-1-co-hexene-1 terpolymer or a propylene-co-hexene-1 copolymer, each polymer made using a metal chloride supported Ziegler-Natta catalyst, at a process temperature between about 130 degrees Fahrenheit and about 200 degrees Fahrenheit and at a reactor pressure sufficient to maintain the propylene in a liquid phase without solvent; using 1 wt % to 20 wt % of at least one of: a metallocene-catalyst made polymer; a homopolymer of propylene with 0.1%-5% functionality; and a styrene block copolymer; and wherein the melt viscosity of the terpolymer or copolymer formulation is controlled by addition of hydrogen gas as a chain transfer agent.

19 Claims, No Drawings

METHOD FOR MAKING HEXENE-1 CONTAINING AMORPHOUS POLY ALPHA OLEFINS FOR IMPROVED HOT-MELT ADHESIVES

CROSS-REFERENCE TO RELATED APPLICATIONS

This continuation application claims the benefit U.S. Non-Provisional application Ser. No. 15/486,115, filed on Apr. 12, 2017 which claims the benefit of U.S. Provisional Application No. 62/321,663, filed on Apr. 12, 2016, the contents of which are hereby incorporated by reference in their entirety.

FIELD

The present embodiment generally relates to a method to make formulations suitable for use as hot-melt adhesives and pressure-sensitive adhesives. More particularly, it relates to a method to make APAO-based adhesives

BACKGROUND

A need exists for a more energy efficient method to make hot melt adhesive (HMA)s containing amorphous poly alpha olefins.

The present embodiments meet these needs.

DETAILED DESCRIPTION OF THE EMBODIMENTS

Before explaining the present method in detail, it is to be understood that the method is not limited to the particular embodiments and that it can be practiced or carried out in various ways.

Amorphous poly-alpha-olefins (APAO) are produced by the (co-) polymerization of alpha-olefins, e.g. propylene or 1-butene with Ziegler-Natta catalysts. The (co-) polymers have an amorphous structure which makes them useful for the production of hot melt adhesives (HMAs).

Propylene-co-hexene-1 copolymers (CASRN 25895-44-7), optionally containing 1-butene monomer to form propylene-co-hexene-1-co-butene-1 terpolymers, are made using a metal chloride supported Ziegler-Natta catalyst either with or without an in-reactor added external organosilicon donor.

Copolymers and terpolymers made according to the invention, may be used in the formulation of improved-performance APAO-based hot melt adhesives.

Due to the compositional nature of propylene-co-hexene-1 copolymer APAOs, and optionally propylene-co-hexene-1-co-butene-1 terpolymers, each of the comonomers adds a unique set of properties to the APAO, which may be enhanced, or changed, by the addition of an external organosilicon donor.

The use of these APAO copolymers and terpolymers, may add unique properties when used as components in hot melt adhesive formulations such as those used preferentially in pressure-sensitive adhesives and also in such applications as in personal hygiene products (e.g. diapers, feminine hygiene, elastic attachment, etc.), in assembly, construction, lamination, footwear and other applications that require such properties as permanent tackiness, controllable open time, low-temperature flexibility, good temperature resistance and other such desirable properties.

The invention relates to a method to make a hot-melt formulation with 50 wt % to 100 wt % of a propylene-co-butene-1-co-hexene-1 terpolymer or a propylene-co-hexene-1 copolymer (each made using a metal chloride supported Ziegler-Natta catalyst, at a process temperature between about 130 degrees Fahrenheit and about 200 degrees Fahrenheit, and at a reactor pressure sufficient to maintain the propylene in a liquid phase without solvent); using 1 wt % to 20 wt % of at least one of: a metallocene-catalyzed propylene homopolymer or an ethylene-propylene copolymer; a homopolymer of propylene with 0.1%-5% functionality; and a styrene block copolymer; and wherein the melt viscosity of the terpolymer or copolymer in the formulation as determined by ASTM Test Method D-3236, is controlled by addition of hydrogen gas as a chain transfer agent.

APAO Copolymers

A hot melt adhesive (HMA) according to the present invention may be made up of a propylene-co-hexene-1 copolymer APAO with a hexene-1 content of about 10 wt. %, more preferably, about 25 wt. %, much more preferably with about 30 wt. % and most preferably with about 50 wt. % by weight but it may contain up to 90 wt. %. This copolymer may be utilized in an unformulated form, that is, as-obtained from the reactor. When applied, or coated, as a hot melt, or cast from an organic solvent solution, onto a substrate such as stock paper or a plastic film or any other porous or non-porous substrate (the primary substrate) by any of the commercially known and used coating methods, the subject of this invention bonds strongly, forming a destructive bond to the primary substrate.

Pressure sensitive applications (PSAs) require good adhesion to a variety of substrates, but such adhesion should be reversible and no adhesive should be transferred to the surface or secondary substrate or substrates onto which the primary substrate coated with the HMA subject of this invention, may be applied. This copolymer exhibits this type of PSA properties. Such types of pressure sensitive adhesives may be considered for removable applications such as removable tapes and labels.

APAO Terpolymers

The addition of another monomer component such as butene-1, results in a propylene-co-hexene-1-co-butene-1 terpolymer APAO with an even broader envelope of PSA- and other HMA-properties and performance. The terpolymer may have a butene-1 content of up to 40 wt. %; however, the terpolymer can have about 5% to 25 wt. % and most preferably 5 to 10 wt. % by weight of butene-1.

External Organosilicon Donor

An external organosilicon donor of the organosilicon class, such as for example cyclohexyl methyl dimethoxysilane (CMDMS), or phenyl triethoxysilane (PES) can be used in the method to make the terpolymer and the method to make the copolymer.

The external organosilicon donor can impart certain unique characteristics to the physical and mechanical properties of the copolymer and also to the terpolymer, properties that reflect favorably in the final performance of the hot melt adhesive.

Additional Components

Other compatible polymers which may be included in the formulation of the subject HMA include, for example, hydrogenated styrene block copolymers of the SEBS and SEPS type and polyethylenes such as LLDPE of melt indices (MIs) of typically more than 500 dg/min. Also used, preferably as the minor component, may be the so-called metallocene polyethylenes (mPE) which are known in the art as "mPEs" and whose composition consists of ethylene copolymerized with such alpha-olefins as 1-butene or 1-hexene or 1-octene. Metallocene polypropylenes (known as "mPP"), of the appropriate molecular weight so as to be compatible with the subject APAO terpolymer, may also be added as a minor component. Additional components may also include maleic anhydride grafted polyethylene, Fischer-Tropsch waxes as well as metallocene waxes.

Also, so-called liquid plasticizers such as mineral, paraffinic or naphthenic oils, may be used in the terpolymer-based formulation to add such properties as melt viscosity control, tackiness and controllable open time. Additionally, components such as anti-oxidants and UV stabilizers may be added as co-adjuvants.

Both the propylene-co-hexene-1 copolymer and propylene-co-butene-1-co-hexene-1 terpolymer may be made according to the teachings of U.S. Pat. No. 4,847,340, whereby they are made at a temperature between about 130 degree F. and about 175 degree F. and at a reactor pressure sufficient to maintain propylene in the liquid phase (in the absence of any added solvent), and in the presence of from about 0.7 to about 3.0 mol % hydrogen based on the monomer feed. The hydrogen concentration present during the manufacture of the subject copolymers and terpolymers may be adjusted so that their melt viscosity, measured at 375 degrees Fahrenheit, is less than 8500 cps, preferably less than 8000 cps.

The use of the propylene-hexene-1 and propylene-co-hexene-1-cobutene-1 APAOs made in the presence of the externally added organosilicon when used either unformulated or, alternatively, properly formulated with the above-named co-adjuvants, at concentrations of between 0 to about 15 wt. % of the above-mentioned wax(es), or between 0 and 25 wt. % of the above mentioned oil(s), will result in hot melt adhesives with enhanced properties for use in pressure-sensitive adhesives, and also in personal hygiene products (e.g. diapers, feminine hygiene, elastic attachment, etc.), in assembly, and other such applications.

The above-named co-adjuvants may interact with the long polymeric chains of the propylene-co-hexene-1 and propylene-co-hexene-1-butene-1 APAOs made in the presence of the externally added organosilicon in such a way as to result in a hot melt adhesive (HMA) with a lower, yet desirable, melt viscosity which results in better wetting and penetration of various substrates, porous, or non-porous, resulting in a higher degree of adhesive bonding. Also, the interaction of the multiple components results in a higher, yet controllable, tackiness for such applications which demand a certain degree of tackiness and pressure sensitive adhesiveness. Other interactions will become obvious to the user.

A hot-melt adhesive according to the invention may comprise: (a) an APAO copolymer or APAO terpolymer, made in the presence of an externally added organosilicon donor; (b) a wax component of the type(s) described above; and (c) a liquid plasticizer such as mineral oil or a naphthenic oil.

Terpolymer Method

The invention disclosed herein is a method to make a hot-melt formulation including 50 wt % to 80 and up to 100 wt % of a propylene-co-butene-1-co-hexene-1 terpolymer made using a metal chloride supported Ziegler-Natta catalyst, at a process temperature between about 130 degrees Fahrenheit and about 175 degrees Fahrenheit and at a reactor pressure sufficient to maintain the propylene in a liquid phase without solvent.

The terpolymer has from 5 wt % to 60 wt % of hexene-1, based on the total weight percent of the terpolymer; and from 2 wt % to 60 wt % of butene-1 based on the total weight of the terpolymer, wherein the propylene-co-butene-1-co-hexene-1 terpolymer has a melt viscosity at 375 degrees Fahrenheit of less than 8500 cps when controlled by addition of hydrogen gas as a chain transfer agent.

In this terpolymer method, there is added from 1 wt % to 20 wt % of at least one of a metallocene catalyst made polymer which exclusively includes either: a metallocene or single site catalyst-made polyethylene, a metallocene catalyst made polypropylene, or a blend of the metallocene or single site catalyst-made polyethylene and metallocene catalyst made polypropylene, a homopolymer of propylene with 0.1% to 5% functionality or a styrene block copolymer with a melt flow rate of more than 20 g/10 min.

In embodiments, the method for making a hot-melt polymer adhesive formulation includes the step of using the propylene-co-butene-1-co-hexene-1 terpolymer made with an externally-added organosilicon donor.

In embodiments, the method for making a hot-melt polymer adhesive formulation, includes an additional step of blending a propylene-co-hexene-1 copolymer to the terpolymer, wherein the copolymer comprises 0.1 wt % to 50 wt % of the total weight of the hot melt formulation.

In embodiments, the method for making a hot-melt polymer adhesive formulation includes the step of blending the propylene-co-butene-1-co-hexene-1 terpolymer, with a propylene-co-hexene-1 copolymer made with a metal chloride supported Ziegler-Natta catalyst at a process temperature between about 130 degrees Fahrenheit and about 200 degrees Fahrenheit at a reactor pressure sufficient to maintain propylene in a liquid phase in the absence of solvent.

In embodiments, the method for making a hot-melt terpolymer adhesive includes the step of blending into the formulation 0.1 wt % to 10 wt % of a wax component based on the total weight of the hot melt formulation.

In embodiments, the wax component can be a paraffinic wax or a metallocene wax.

In embodiments, the method for making a hot-melt terpolymer adhesive formulation includes the step of blending into the formulation 0.1 wt % to 10 wt % a liquid plasticizer based on the total weight of the hot melt formulation In embodiments, the liquid plasticizer can include a napththenic oil, a paraffinic oil, or a mineral oil.

In embodiments, the metal chloride in the supported Ziegler-Natta catalyst can consist of magnesium dichloride.

In embodiments, the hydrogen gas concentration acts as a chain transfer agent during the terpolymer manufacture, and the hydrogen gas concentration can be adjusted such that the terpolymer melt viscosity measured at 375 degrees Fahrenheit is less than 8500 centipoise.

In embodiments, the method for making a hot-melt polymer adhesive formulation of claim 3, comprising: adding 3 wt % to 11 wt % of the styrene block copolymer based on the total weight of the hot melt formulation.

In this embodiment, the propylene-co-hexene-1 copolymer consists of: from 5 wt % to 60 wt % of hexene-1 monomer based on the total weight percent of the copolymer.

To the copolymer, is blended from 1 wt % to 20 wt % of at least one of: a metallocene catalyst made polymer; a homopolymer of propylene with from 0.1% to 5 wt % functionality; and a styrene block copolymer.

The propylene-co-hexene-1 copolymer melt viscosity, as determined by ASTM Test Method D-3236, is controlled by addition of hydrogen gas as a chain transfer agent, the hydrogen functioning as an additive.

In embodiments of this method for making a hot-melt copolymer adhesive formulation, an additional step can be implemented of using an externally-added organosilicon donor during the manufacture of the propylene-co-hexene-1 copolymer.

In embodiments of this method for making a hot-melt copolymer adhesive formulation there can be the additional step of blending into the formulation, 0.1 wt % to 10 wt % of a wax component based on the total weight of the hot melt formulation.

In embodiments of this method, the wax component can be a paraffinic wax or a metallocene wax.

In embodiment of the method for making a hot-melt copolymer adhesive formulation there can be the additional step of blending into the formulation 0.1 wt % to 10 wt % a liquid plasticizer based on the total weight of the hot melt formulation.

The liquid plasticizer for the copolymer formulation can be a napththenic oil or a paraffinic oil, or a mineral oil.

An embodiment of the method for making a hot-melt copolymer adhesive formulation contemplates that the metal chloride in the supported Ziegler-Natta catalyst can consist of magnesium dichloride.

Experimental Conditions:

Several propylene-co-hexene-1 copolymerization and propylene-co-butene-1-co-hexene-1 terpolymerization reactions were carried out either in the absence or in the presence of an external organosilicon donor. Externally added organosilicon donors such as phenyltriethoxysilane (PES or A-Donor, CAS No. 780-69-8) or cyclohexylmethyldimethoxysilane (CMDMS or C-Donor, CAS No. 17865-32-6) were used. Other organosilicon external donors such as diphenyldimethoxysilane (B-Donor, CAS No. 6843-66-9), diisobutyldimethoxy silane (CAS No. 17980-32-4), dicyclopentyldimethoxy silane (DDMS or D-Donor, CAS No. 126990-35-0) and diisopropyldimethoxy silane (DPMS or P-Donor, CAS No. 18230-61-0) may also be used.

The polymerization reactions were carried out in an Autoclave Engineers™ 1-L autoclave typically at 70 degrees Celsius and for one hour. Before running a reaction, the autoclave was cleaned of any residual polymer from any previous reaction using an organic solvent such as heptane to assure a clean reactor. The agitator/mixer assembly was placed on top of the autoclave which was then tightened securely. The autoclave was then heated, or baked, at 150 degrees Celsius, under a dry nitrogen atmosphere for about one hour, and then the autoclave was cooled to about 40 degrees Celsius, still under a nitrogen blanket. The temperature was controlled with a Julabo GmbH temperature control unit. A more detailed description of the polymerization process is described for example in U.S. Pat. Nos. 5,681,913, 5,637,665, 5,714,554 and/or 5,302,675. Once the reactor reached the set temperature, a mineral oil slurry of the catalyst, pre-contacted with the alkyl aluminum co-catalyst, TEA, was dosed into the reactor, followed by the monomers [propylene (CAS No. 115-07-1), butene-1 (CAS No. 106-98-9) and hexene-1 (CAS No. 592-41-6)], and by the hydrogen gas. The reaction was started by turning on the agitator and typically the reactions were quite exothermic but the Julabo unit was efficient in controlling the reaction temperature. The order of addition of the reactants may be varied to a certain extent, but the catalyst/cocatalyst mixture was always introduced first. After the prescribed reaction time, for example 1 hour, the agitator was stopped, the temperature of the Julabo unit was reduced and the autoclave was slowly depressurized to remove any unreacted reactants. Due to the high productivity, in grams of polymer produced per gram of catalyst, no catalyst deactivation, other than exposure to the atmosphere, was required. Once decompressed, the top was removed and the polymer was harvested from the reactor. Other polymerization reaction temperatures as low as 40 degrees Celsius and as high as 90 degrees Celsius may also be used. Reaction times may range from 5 minutes to as long as three hours. The reactions were performed in the absence of any added organic solvent because the liquefied monomers a) serve to remove the high exothermal heat of polymerization reaction, and b) serve as the suspension medium for the formed polymeric products.

The propylene monomer used was of very high purity, typically 99.99%+propylene with the remaining components being low-molecular-weight saturated hydrocarbons. This type of propylene is known in the trade as PGP or polymer grade propylene. Other propylene grades such as CGP, or chemical grade propylene, typically made up of at least 90+% propylene with the balance consisting of inert hydrogenated hydrocarbons may also be used. RGP, or refinery grade propylene, wherein the propylene content is usually 65-75%, propane is 20-30%, with the balance butane/butylene (BB) and ethylene/ethane may also be used but it gives quite low polymer yields.

The butene-1 monomer used was high purity plant butene-1 or it may be from what is called bottled, in small tanks, butene-1, with purities typically over 99+%. The hexene-1 used in the reactions was high purity (>97%) from vendors such as Sigma-Aldrich.

Example 1

A method for making a hot melt polymer adhesive formulation comprising blending 95 wt % of a propylene-co-butene-1-co-hexene-1 terpolymer made using a metal chloride supported Ziegler-Natta catalyst, at a process temperature of about 130 degrees Fahrenheit and at a reactor pressure sufficient to maintain the propylene in a liquid phase without solvent with 5 wt % of a blend of the metallocene catalyst-made polyethylene and a polypropylene made using a metallocene catalyst.

The terpolymer has 5 wt % of a hexene-1 based on the total weight percent of the terpolymer; and 60 wt % of butene-1 based on the total weight of the terpolymer, wherein the propylene-co-butene-1-co-hexene-1 terpolymer has a melt viscosity at 375 degrees Fahrenheit of less than 8500 cps when controlled by addition of hydrogen gas as a chain transfer agent.

Example 2

A method for making a hot melt polymer adhesive formulation comprising blending 80 wt % of a propylene-co-butene-1-co-hexene-1 terpolymer made using a metal chloride supported Ziegler-Natta catalyst, at a process temperature of about 175 degrees Fahrenheit and at a reactor pressure sufficient to maintain the propylene in a liquid phase without solvent, with 20 wt % of a blend of a single site catalyst-made polyethylene and a polypropylene made using a metallocene catalyst.

The terpolymer has 60 wt % of hexene-1 based on the total weight percent of the terpolymer; and 2 wt % of butene-1 based on the total weight of the terpolymer, wherein the propylene-co-butene-1-co-hexene-1 terpolymer has a melt viscosity at 375 degrees Fahrenheit of less than 8500 cps when controlled by addition of hydrogen gas as a chain transfer agent.

Example 3

A method for making a hot melt polymer adhesive formulation comprising 90 wt % of a propylene-co-hexene-1 copolymer, a propylene-co-hexene-1 copolymer made with a metal chloride supported Ziegler-Natta catalyst at a process temperature between about 130 degrees Fahrenheit and about 200 degrees Fahrenheit at a reactor pressure sufficient to maintain propylene in a liquid phase in the absence of solvent; with 10 wt % of a styrene block copolymer such as a low molecular weight SEBS. The propylene-co-hexene-1 copolymer melt viscosity is controlled by addition of a hydrogen gas as a chain transfer agent, the hydrogen functioning as an additive.

Example 4

A method for making a hot melt polymer adhesive formulation comprising 90 wt % of a propylene-co-hexene-1 copolymer, a propylene-co-hexene-1 copolymer made with a metal supported Ziegler-Natta catalyst at a process temperature between about 130 degrees Fahrenheit and about 200 degrees Fahrenheit at a reactor pressure sufficient to maintain propylene in a liquid phase in the absence of solvent; with 10 wt % of a metallocene-made polypropylene polymer. The propylene-co-hexene-1 copolymer melt viscosity is controlled by addition of hydrogen gas as a chain transfer agent, the hydrogen functioning as an additive.

Example 5

The method of example 5 uses the method of Example 1, and adds 1 wt % of a wax component based on the total weight of the hot melt formulation.

Example 6

The method of example 6 uses the method of Example 1, and adds 10 wt % of a wax component based on the total weight of the hot melt formulation.

Example 7

The method of example 7 uses the method of Example 1, and adds 1 wt % of a liquid plasticizer based on the total weight of the hot melt formulation.

Example 8

The method of example 8 uses the method of Example 1, and adds 10 wt % of a liquid plasticizer based on the total weight of the hot melt formulation.

Example 9

The method of example 9 uses the method of Example 1 and adds 3 wt % of the styrene block copolymer based on the total weight of the hot melt formulation.

Example 10

The method of example 10 uses the method of Example 1 and adds 11 wt % of the styrene block copolymer based on the total weight of the hot melt formulation.

Example 11

The method of Example 11 uses the method of example 3 and adds 0.1 wt % of a wax component based on the total weight of the hot melt formulation.

Example 12

The method of Example 12 uses the method of example 4 and adds 10 wt % of a wax component based on the total weight of the hot melt formulation.

Example 13

The method of example 13 uses the method of example 3 and adds 0.1 wt % of liquid plasticizer based on the total weight of the hot melt formulation.

Example 14

The method of example 14 uses the method of example 4 and adds 10 wt % of liquid plasticizer based on the total weight of the hot melt formulation.

The foregoing presents particular embodiments of the method embodying the principles of the invention. Those skilled in the art will be able to devise alternatives and variations which, even if not explicitly disclosed herein, embody those principles and are thus within the scope of the invention. Although particular embodiments of the present invention have been shown and described, they are not intended to limit what this patent covers. One skilled in the art will understand that various changes and modifications may be made without departing from the scope of the present invention as literally and equivalently covered by the following claims.

While these embodiments have been described with emphasis on the embodiments, it should be understood that within the scope of the appended claims, the embodiments might be practiced other than as specifically described herein.

What is claimed is:

1. A method for making a hot-melt terpolymer adhesive formulation comprising:
   a. blending 50 wt % to 99 wt % of a propylene-co-butene-1-co-hexene-1 terpolymer made with a metal chloride supported Ziegler-Natta catalyst, at a process temperature between about 130 degrees Fahrenheit and about 200 degrees Fahrenheit and at a reactor pressure sufficient to maintain the propylene in a liquid phase without solvent, wherein the propylene-co-butene-1-co-hexene-1 terpolymer consists of:
      (i) from 5 wt % to 60 wt % of hexene-1 monomer based on the total weight percent of the terpolymer; and
      (ii) from 2 wt % to 60 wt % of butene-1 monomer based on the total weight of the terpolymer, wherein the propylene-co-butene-1-co-hexene-1 terpolymer has a melt viscosity at 375 degrees Fahrenheit of less than 8500 cps;
   with 1 wt % to 20 wt % of at least one of:
      a metallocene catalyst made polymer;
      a homopolymer of propylene with 0.1%-5% functionality; and
      a styrene block copolymer.

2. The method for making a hot-melt terpolymer adhesive formulation of claim 1, further comprising manufacturing the propylene-co-butene-1-co-hexene-1 terpolymer by externally adding an organosilicon donor.

3. The method for making a hot-melt terpolymer adhesive formulation of claim 1, comprising blending in a propylene-co-hexene-1 copolymer to the terpolymer, wherein the copolymer comprises 0.1 wt % to 50 wt % of the total weight of the hot melt formulation.

4. The method for making a hot-melt terpolymer adhesive formulation of claim 3, comprising blending as the propylene-co-hexene-1 copolymer, a propylene-co-hexene-1 copolymer made with a metal chloride supported Ziegler-Natta catalyst at a process temperature between about 130 degrees Fahrenheit and about 200 degrees Fahrenheit at a reactor pressure sufficient to maintain propylene in a liquid phase in the absence of solvent and adding hydrogen as the chain transfer agent to control a melt viscosity of the propylene-co-butene-1-co-hexene-1 terpolymer.

5. The method for making a hot-melt terpolymer adhesive formulation of claim 4, comprising externally adding an organosilicon donor during the manufacture of the propylene-co-hexene-1 copolymer.

6. The method for making a hot-melt terpolymer adhesive formulation of claim 1, comprising: blending into the formulation 0.1 wt % to 10 wt % of a wax component based on the total weight of the hot melt formulation.

7. The method for making a hot-melt terpolymer adhesive formulation of claim 6, wherein the wax component is a paraffinic wax or a metallocene wax.

8. The method for making a hot-melt terpolymer adhesive formulation of claim 1, comprising blending into the formulation 0.1 wt % to 10 wt % a liquid plasticizer based on the total weight of the hot melt formulation.

9. The method for making a hot-melt terpolymer adhesive formulation of claim 8, wherein the liquid plasticizer consists of: a naphthenic oil or a paraffinic oil, or a mineral oil.

10. The method for making a hot-melt terpolymer adhesive formulation of claim 1, wherein the metal chloride of the supported Ziegler-Natta catalyst consists of magnesium dichloride.

11. The method for making a hot-melt terpolymer adhesive formulation of claim 1, further comprising:
adding a hydrogen gas to act as a chain transfer agent during the manufacture of the propylene-co-butene-1-co-hexene-1 terpolymer, and
adjusting the hydrogen gas, thereby enabling the terpolymer melt viscosity, as measured at 375 degrees Fahrenheit, to be less than 8500 centipoise.

12. The method for making a hot-melt terpolymer adhesive formulation of claim 3, comprising: adding 3 wt % to 11 wt % of a styrene block copolymer based on the total weight of the hot melt formulation.

13. A method for making a hot-melt copolymer adhesive formulation comprising:
a. blending 50 wt % to 99 wt % of a propylene-co-hexene-1 copolymer, a propylene-co-hexene-1 copolymer made with a metal chloride supported Ziegler-Natta catalyst at a process temperature between about 130 degrees Fahrenheit and about 200 degrees Fahrenheit at a reactor pressure sufficient to maintain propylene in a liquid phase in the absence of solvent; wherein the propylene-co-hexene-1 copolymer consists of:
(i) from 5 wt % to 60 wt % of hexene-1 monomer, based on the total weight percent of the copolymer; and
(ii) from 2 wt % to 60 wt % of butene-1 monomer, based on the total weight of the copolymer;
with 1 wt % to 20 wt % of at least one of:
a metallocene catalyst made polymer;
a homopolymer of propylene with 0.1%-5% functionality; and
a styrene block copolymer; and
wherein the propylene-co-hexene-1 copolymer melt viscosity is controlled by addition of hydrogen gas as a chain transfer agent.

14. The method for making a hot-melt copolymer adhesive formulation of claim 13, comprising externally adding an organosilicon donor during the manufacture of the propylene-co-hexene-1 copolymer.

15. The method for making a hot-melt copolymer adhesive formulation of claim 13, comprising: blending into the formulation 0.1 wt % to 10 wt % of a wax component based on the total weight of the hot melt formulation.

16. The method for making a hot-melt copolymer adhesive formulation of claim 15, wherein the wax component is a paraffinic wax or a metallocene wax.

17. The method for making a hot-melt copolymer adhesive formulation of claim 13, comprising blending into the formulation 0.1 wt % to 10 wt % a liquid plasticizer based on the total weight of the hot melt formulation.

18. The method for making a hot-melt copolymer adhesive formulation of claim 17, wherein the liquid plasticizer consists of: a naphthenic oil or a paraffinic oil, or a mineral oil.

19. The method for making a hot-melt copolymer adhesive formulation of claim 13, wherein the metal chloride in the supported Ziegler-Natta catalyst consists of magnesium dichloride.

\* \* \* \* \*